June 23, 1953   J. E. BIRDSALL   2,642,819
MACHINE FOR MAKING FOOD PRODUCTS
Filed Nov. 10, 1948   3 Sheets-Sheet 2
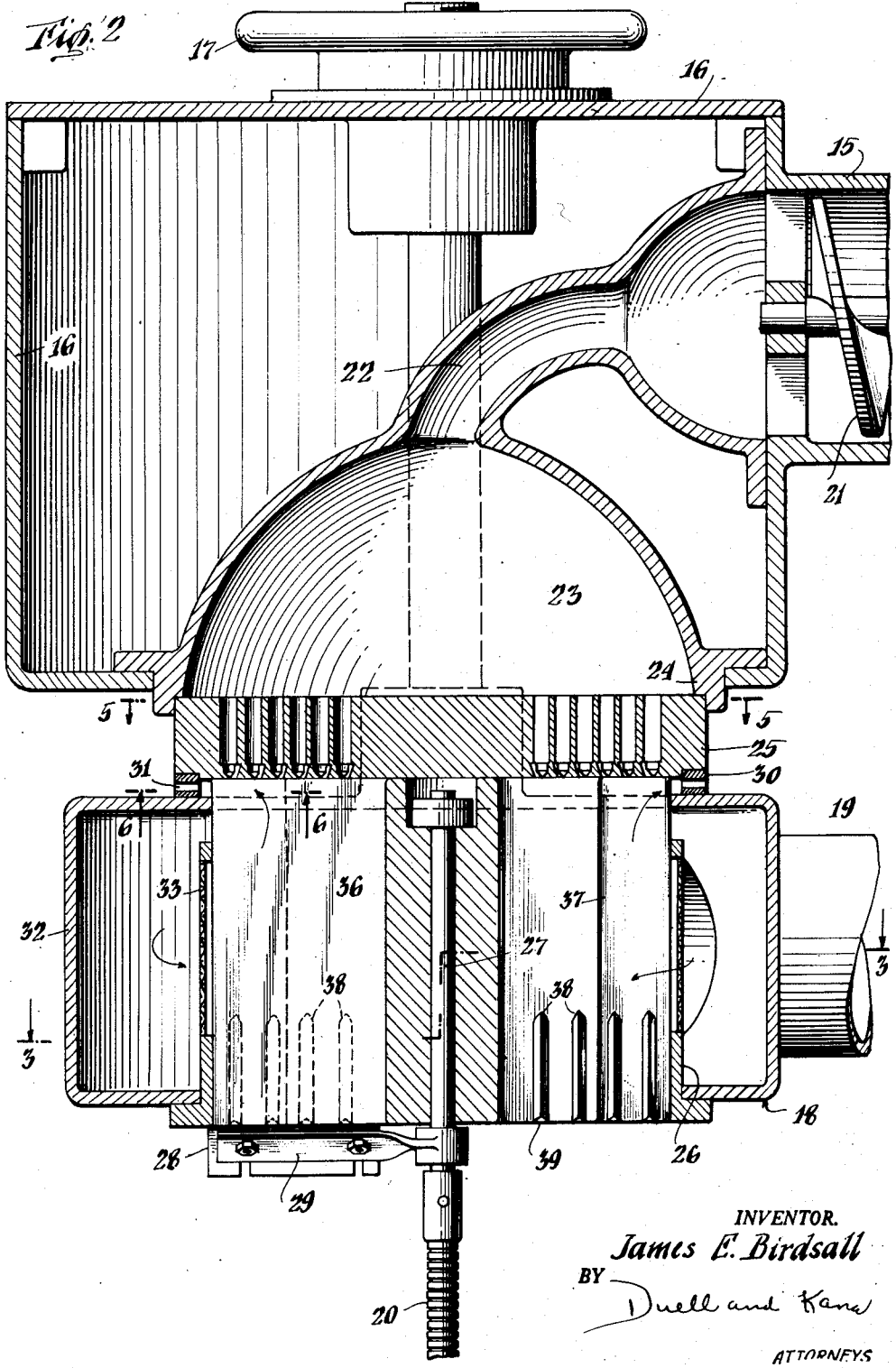
INVENTOR.
James E. Birdsall
BY Duell and Kane
ATTORNEYS

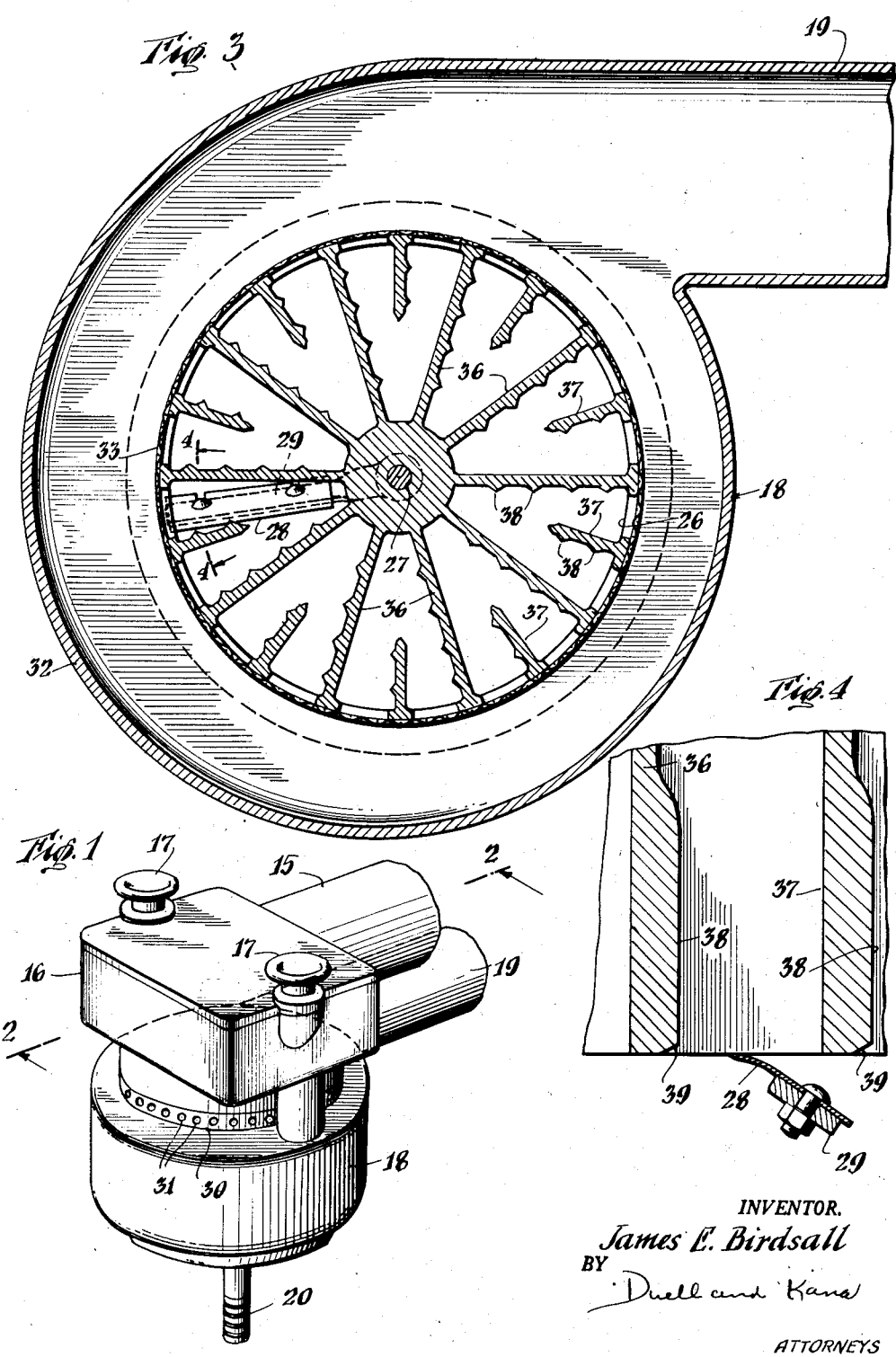

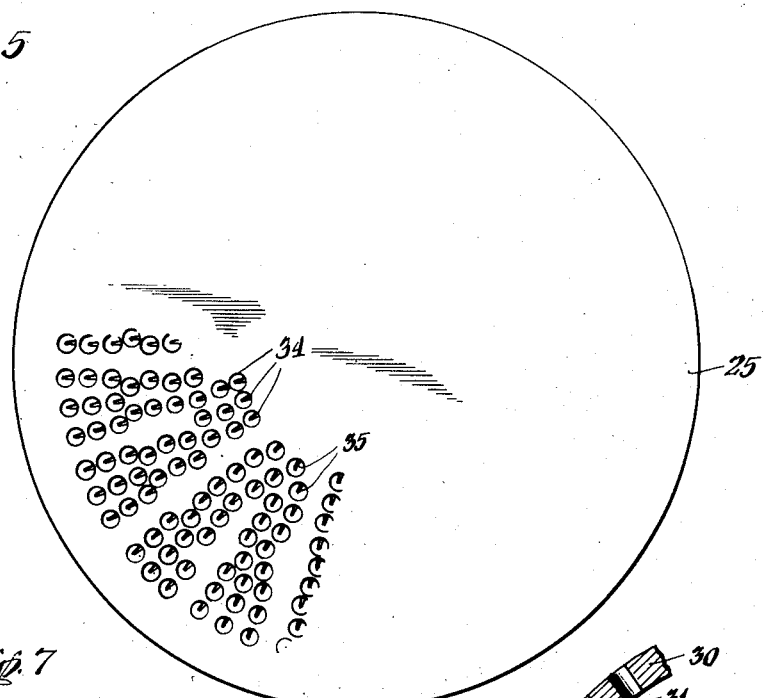
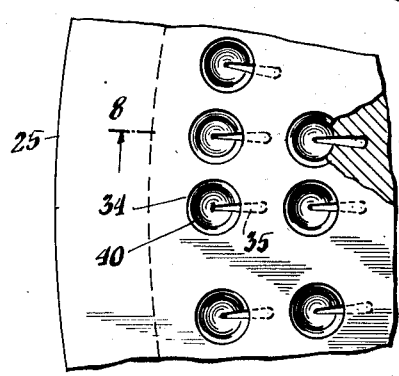
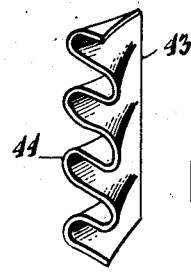
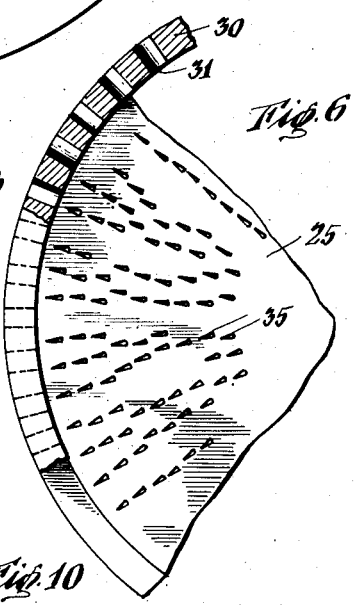
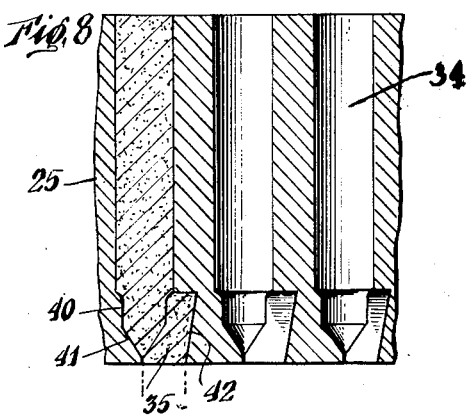
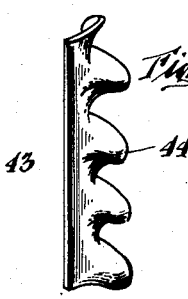
INVENTOR.
James E. Birdsall
ATTORNEYS Patented June 23, 1953

2,642,819

UNITED STATES PATENT OFFICE 2,642,819

MACHINE FOR MAKING FOOD PRODUCTS

James E. Birdsall, Bound Brook, N. J., assignor to C. F. Mueller Co., Jersey City, N. J., a corporation of Delaware Application November 10, 1948, Serial No. 59,391

5 Claims. (Cl. 107—14)

This invention relates to a structurally and functionally improved food making machine as well as a novel method for producing a food product in addition to the product itself.

It is an object of the invention to provide a food product formed of an alimentary paste, which product, aside from presenting a novel and pleasing appearance, will not tend to adhere to the surfaces of the receptacle within which it is cooked or prepared. The term "noodle" may hereinafter be employed in its generic sense to designate the product which—according to the shape of the die—may specifically take the form of a macaroni, a noodle or any related food product.

A further object of the invention is that of teaching a method of producing a food product of this type and which method may be readily and economically practiced so that large quantities of the product may be produced at relatively nominal figures.

A still further object is that of furnishing a machine, the parts of which will be few in number and of rugged design to be assembled in the form of a unitary apparatus operating over long period of time with freedom from all difficulties and in its operation producing food products of uniform and satisfactory quality.

With these and other objects in mind, reference is had to the attached sheets of drawings in which one embodiment of the invention has been illustrated and in which:

Fig. 1 is a perspective view of the end assembly of a machine;

Fig. 2 is a sectional view taken along the lines 2—2 and in the direction of the arrows as indicated in Fig. 1;

Fig. 3 is a sectional plan view taken along the lines 3—3 and in the direction of the arrows as indicated in Fig. 2;

Fig. 4 is a fragmentary enlarged sectional view taken along the lines 4—4 and in the direction of the arrows as indicated in Fig. 3;

Fig. 5 is a face view of the top of the die and taken along the lines 5—5 and in the direction of the arrows as indicated in Fig. 2;

Fig. 6 is a fragmentary under or rear face view of the die;

Fig. 7 is an enlarged fragmentary view of the structure as shown in Fig. 5;

Fig. 8 is a transverse sectional view taken along the lines 8—8 and in the direction of the arrows as indicated in Fig. 7;

Fig. 9 is a perspective view taken from what might be termed the front of the food product; and Fig. 10 is a similar perspective view taken from a point beyond the rear edge or face of that product.

Referring primarily to Figs. 1, 2 and 3, it will be seen that the numeral 15 indicates the rear of the discharge portion of a main machine which serves to prepare a suitable mixture of material from which the food product hereinafter described is to be manufactured. Secured to this part of the machine is a head portion generally indicated by the reference numeral 16. This portion may removably support—by securing means such as has been indicated at 17—an assembly 18. Connected to the latter is a tube or conduit 19 and, if desired, a flexible drive shaft 20, the purposes of which will be hereinafter described.

As is well known to those skilled in the art, machines for producing a mix proper for the manufacture of noodles has been on the market for some time. These machines have usually included suitable proportioning controls and feeds and by means of which the several ingredients to be combined in the product are introduced into a mixing trough or other suitable part of the machine and in properly controlled ratios. In this trough or receptacle portion, the ingredients are subjected to agitation such that a homogeneous mixture of even consistency is produced.

In these machines the mixture is then transferred to a feeding chamber within which the mixture is compacted. The material is fed through this chamber or passage preferably by means of a screw such as has been indicated at 21 in Fig. 2. Thereupon the mixture passes in compacted form through a passage 22 to a feeding head or cavity 23.

In accordance with the teachings of the present invention, this cavity or head preferably terminates in a flange 24 against which the body 25 of a die seats. Below the latter, a guiding unit generally indicated by the numeral 26 is disposed; this unit also providing one part of a severing assembly. The unit also rotatably mounts a shaft 27, the lower end of which extends below its lower face and supports a blade 28 mounted by an arm 29 secured to the shaft 27. This blade in cooperation with the surfaces of the guiding unit furnishes the complete severing assembly. The blade is rotated by conveniently coupling the end of shaft 27 with the flexible shaft 20; it being obvious that any alternative form of drive might be employed.

Interposed between the body 25 of the die and the guiding unit 26 is a ring 30 preferably formed with an annular series of openings 31. Supported below the ring 30 and encasing the side walls of unit 26 is a channel member 32 connected with the duct 19. A screening or mesh 33 preferably defines the side walls of unit 26.

The die body 25 is formed with transversely extending passages. In their upper ends each of these passages may simply define a tube portion 34 which extends to a point adjacent but spaced from the lower face of body 25. These tube portions are continued in the form of slits 35 as shown in Fig. 8. Referring particularly to Fig. 7, it will be observed that the slits are wider adjacent one of their ends than at their opposite end or edge portion and the side walls of each slit may be substantially straight and define with the adjacent wall, a tapered space. These passages through the die are arranged in the form of separated groups as especially shown in Figs. 5 and 6.

The guiding member 26 is formed with partitions 36 preferably extending throughout its entire height. Intermediate these partitions, further partitions 37 form a part of the guiding member. The latter partitions need extend upwardly within that member throughout only the lower part of its height to subdivide the material in its passage therethrough and to cooperate with blade 28. Both the partitions 36 and 37 have longitudinally extending ribs 38 formed in their side faces. The lower edges of the partitions 36 and 37 as especially shown in Fig. 4 are undercut as for example at 39, to provide maximum guiding and cooperating action with the edge of the blade 28.

In operation, it will be understood that with the ingredients properly portioned and intermixed, they will be supplied by the main machine through portion 15 by the conveying screw 21 to the passage 22. They will further compact within the head or cavity 23 and upon this space being filled the mixture will pass into the passages or bores of the die body 25. From the lower end of these passages the product will feed through the body of the guiding unit 26 between the partitions of the same and upon passing beyond the unit 26 will be severed into sections by the blade 28 in cooperation with the lower edges of the partitions, 36 and 37.

As will be understood, the mixture, after passing through the passages of the die, will be in the form of separate strands. Depending upon the rate of feed of the mixture and the speed of rotation of the blade 28, the sections severed from these strands will be of greater or lesser lengths. This may be varied in any desired manner but is preferably achieved by maintaining the rate of feed of the mix constant while increasing or decreasing the speed of rotation of shaft 27. As will be appreciated, the greater the speed of rotation of this shaft and consequently the knife 28, the shorter will be the length of the severed sections. Conversely the slower the speed of rotation of the knife the greater will be the length of the sections.

As shown, the guiding unit 26 is disposed with reference to the body 25 of the die in a manner such that its partitions 36 and 37 will be disposed between the groups of passages and especially the slotted or narrow discharge ends 35 of the latter. Therefore, none of these passages will be obstructed in its discharge of material by the partitions. Also, as the strands pass through the guide 26 they will be subjected to a flow of air which is preferably heated. This air will, of course, pass through tube 19 and the interstices of the mesh 33. It will flow around and past the several strands of material extending from the die and will escape downwardly between the partitions and upwardly through the apertures 31 of ring 30. Therefore, the strands will be subjected to a surface drying action before emerging from the guiding member 26.

It is to be remembered that the openings 35 providing the discharge passages of the die are preferably wedge-shaped or in any event are of greater width adjacent one edge than at their opposite edge. This has been clearly shown in Fig. 7. Also as shown in that view, the slits 35 are axially offset with respect to the bores 34. As shown in Fig. 8, this is preferably achieved by having the lower ends of the bores 34 reduced as indicated at 40 and provided with inclined faces 41 below such reduction; an offset chamber 42 communicating with this part of the bore and having its side walls aligned with the side walls of a slit 35. The slit 35 being larger adjacent one of its edges than at the opposite edge, it follows that adjacent the former edge it will offer minimum resistance to the passage of the material or mix. Adjacent its opposite edge—which is of less width—it will offer greater resistance to the flow of material through the die.

Consequently, with the material plastic, it will flow with greater velocity adjacent the enlarged end of the slit and therefore an excess of material will be provided adjacent this edge as the strands of material formed by the die emerge from the body of the latter. Such a result is assured incident to the configuration and relative disposition of the several surfaces 40, 41 and 42, all of which assure that a continuous ribbon or strand of material will emerge from the die free from any voids or interrupted portions.

Consequently, as shown in Figs. 9 and 10, a ribbon or strip is produced which has one of its edges 43 disposed in substantially a straight line; its opposite edge 44 being arranged in a curled or convolute, crenelated form, due to the excess of material fed through the die passage adjacent the point defined by that edge. Of course, according to the difference in passage width of adjacent opposite edges, the more or less the amount of excess material and curving which will exist in edge 44.

Incident to the curling or convoluting of the edge, it has been found that quite aside from any improvement in the appearance of the product, the latter does not tend to adhere to the walls of the receptacle within which it is cooked or placed and despite the fact that any liquid in which it may have been cooked has been poured from the receptacle. This is because the convolutions or crenelations assure a spacing of the noodle from the receptacle wall at a number of points. Thus, the wastage and annoyance incident to the heretofore existing tendency of noodles and similar units to firmly adhere to the receptacle walls is avoided.

From the foregoing it will be understood that among others, the several objects of the invention as specifically aforenoted are achieved. Obviously numerous changes in construction and rearrangement of the parts may be resorted to without departing from the spirit of the invention and likewise — without so departing — the steps of the method herein taught may be varied.

I claim:

1. A food product forming machine, including in combination a die body to be arranged adjacent the discharge end of an apparatus to deliver a food mixture, said body being formed with transversely extending passages through which said mixture is to pass and by means of which it is transformed into strips, an apertured ring disposed beyond said die body, a guiding unit disposed beyond said ring, partitions forming a part of said unit and extending longitudinally of the same, an air delivering channel disposed adjacent said unit, screening mounted by said unit to allow of the flow of air into the interior of the same to the apertures of the ring and strand-severing means cooperative with the lower edges of said partitions and mounted beyond said unit.

2. A food product forming machine, including in combination a transversely apertured die, a strand-guiding unit disposed below said die, an apertured side wall forming the outer surface of said unit, means for delivering air under pressure through the apertures of said side wall into said unit, and a member interposed between said unit and die and formed with a series of apertures through which air may flow from said unit.

3. A food product forming machine, including in combination an apertured die, a strand-guiding unit disposed below said die, an outer wall forming a part of said unit, radially extending spaced partitions connected to said wall and converging inwardly to separate strands formed by said die and passing through said unit, means providing a rotatable mounting in line with the inner ends of said partitions and severing means supported by said mounting to traverse a path adjacent the lower edges of said partitions and to cooperate with the latter to sever strands as they emerge from said unit.

4. A food product forming machine including in combination a die provided with a plurality of transverse forming passages, means for feeding a mass of paste material to move through such passages, a guiding unit disposed below said die and including side walls formed with apertures, a channel member connected to said apertures for supplying air under pressure therethrough and a ring interposed between said die and guiding unit and formed with openings for the escape of such air.

5. A food product forming machine including in combination a die provided with a plurality of transverse forming passages, means for feeding a mass of paste material to move through such passages, a guiding unit disposed below said die and including side walls formed with apertures, a channel member connected to said apertures for supplying air under pressure therethrough, a ring interposed between said die and guiding unit and formed with openings for the escape of such air, partitions extending radially of and within said guiding unit and a severing member rotatably mounted by said unit and moving in contact with the lower edges of said partitions.

JAMES E. BIRDSALL.

References Cited in the file of this patent

UNITED STATES PATENTS

| Number | Name | Date |
|---|---|---|
| D. 91,217 | Ronzoni | Dec. 19, 1933 |
| D. 96,161 | Cirillo | July 9, 1935 |
| 807,972 | Splivalo | Dec. 19, 1905 |
| 855,438 | Ebel | May 28, 1907 |
| 1,159,489 | Gammel | Nov. 9, 1915 |
| 1,355,731 | Block | Oct. 12, 1920 |
| 1,487,378 | Gigliotti | Mar. 18, 1924 |
| 1,570,443 | McSorley | Jan. 19, 1926 |
| 1,592,769 | Imparata | July 13, 1926 |
| 1,685,249 | Tanzi | Sept. 25, 1928 |
| 2,049,754 | Tanzi | Aug. 4, 1936 |
| 2,149,920 | Kretchmer | Mar. 7, 1939 |
| 2,463,112 | Kipnis | Mar. 1, 1949 |

FOREIGN PATENTS

| Number | Country | Date |
|---|---|---|
| 313,736 | Italy | Jan. 4, 1934 |